June 3, 1930. L. A. NEMCOVSKY 1,761,404
TYPEWRITING MACHINE
Original Filed July 15, 1924
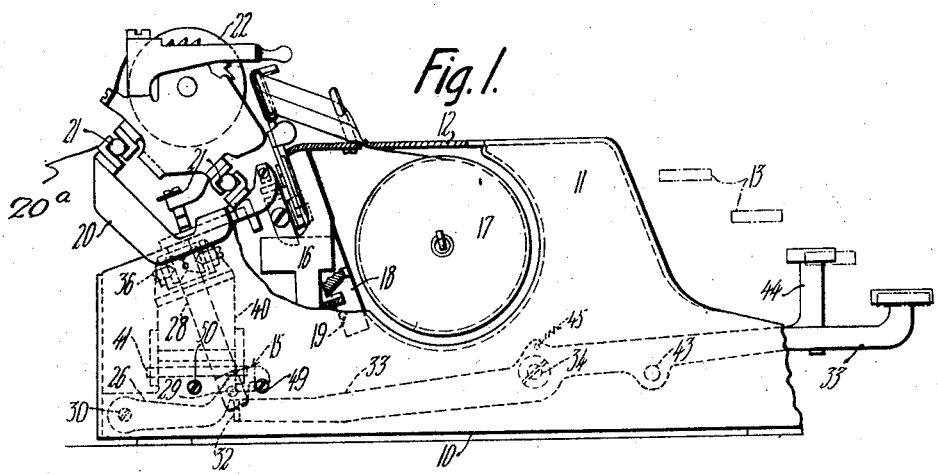
Inventor:
Louis A. Nemcovsky
by B. C. Stickney
Attorney.

Patented June 3, 1930

1,761,404

UNITED STATES PATENT OFFICE

LOUIS A. NEMCOVSKY, OF NEW YORK, N. Y., ASSIGNOR TO SUN TYPEWRITER COMPANY, OF NEW YORK, N. Y., A CORPORATION OF NEW JERSEY

TYPEWRITING MACHINE

Original application filed July 15, 1924, Serial No. 726,063. Divided and this application filed April 23, 1927. Serial No. 185,958.

My present invention relates to typewriting machines and in its more specific application to case-shift mechanisms for machines of the type designated as portable.

This application is a division of my application, Serial No. 726,063, filed July 15, 1924, Patent No. 1,684,801, dated September 18, 1928.

According to a feature of the invention, the parts of the typewriting machine are assembled in a particularly compact relation to confine the outside dimensions of the machine within minimum proportions. The platen is raised in an oblique direction for the case shift and the segment plate is disposed at the same inclination, thereby reducing the height of the machine and affording space below the carriage for the ribbon shift and escapement mechanism (not shown).

Another object of my invention is to provide simple, easily operating case shifting means, easy to assemble and readily and delicately adjustable to properly regulate the shift.

In the preferred embodiment, the typewriter carriage has a pair of rods at right angles to the length thereof, roller bearings being provided therefor in the machine frame, said roller bearings being automatically adjustable about appropriate axes for ready adaptation to the angular travel of the rods.

In the preferred embodiment, the roller bearing for one of the rods is mounted in a bracket pivoted about an axis such as to permit displacement of the roller bearing from the rod, whereby the carriage can be easily assembled upon the frame and the bracket thereupon returned to bring the roller bearings into coaction with the rod, appropriate means being provided to maintain it in a set position.

In the preferred embodiment, the rods are supported upon pivoted levers raised by the depression of a case shift key and adjustable screw stop elements are provided to determine the lowermost and the uppermost position of said levers, and, therefore, of the platen.

Another object of the invention is to provide a case shift lock mechanism of particularly simple and reliable construction. This mechanism preferably comprises a lock key pivoted upon the shift key, and a fixed pin projecting from the machine side frames and coacting with a shoulder on said lock key when set to maintain the shift key depressed.

Other features and advantages will hereinafter appear.

In the accompanying drawings in which is shown one of various possible embodiments of the several features of this invention, Figure 1 is a side elevation, partly broken away, of the machine.

Figures $2^a$ and $2^b$ are sectional views taken respectively along the lines $a$—$a$ and $b$—$b$ of Figures 3 and 4.

Figure 3 is a fragmentary side view showing details of the case shift mechanism.

Figure 4 is a fragmentary detail side view showing the case shift mechanism at the farther side of the machine.

Figure 5 is an enlarged view of the guide rollers, their bearings, and their carrier.

Referring now to the drawings, I have shown a typewriting mechanism including a machine-enclosing frame 10 formed with unitary side walls 11 and a top 12, stamped from sheet-metal and secured to an inner machine frame in the familiar manner as by screws (not shown).

Within the machine frame $10^a$ are supported type bars 14, case shift mechanism 15 and other elements. The machine frame $10^a$ includes upright side lugs 16 for supporting therebetween a separate frame structure upon which are mounted the ribbon spools 17 and the type-bar segment-plate 18, as more fully described in my patent of August 5, 1924, No. 1,504,199.

As shown in the drawings, the segment plate 18 is disposed relatively low, the central or lowest point of the type bar supporting bail 19 thereon being substantially at the level of the lower bank of keys 13. By inclining the segment plate rearward about 20 degrees from the vertical, establishes a case-shift direction for the platen and carriage where gravity is not so pronounced as in a straight up and down direction, materially reduces the over-all height of the machine and raises the typing line for better visibility.

The typewriter carriage support includes a shift-frame 20 having rails 20ª, a cross-bar 20ᵇ and ball bearings 21 on which is mounted the platen-carriage 22. The counterbalance springs (see Figure 3) are shown at 23 secured to the machine side frame 24 each by an eye bolt and nut 25 and at the opposite end each to a lever 26 through which the carriage is elevated for case shifting by mechanism to be described below. By adjustment of nuts 25, the tension of springs 23 may be regulated to accurately adjust the counterbalance.

The case shift mechanism comprises a pair of rods 27 and 28 rigid with the typewriter carriage-shift frame 20 and extending at right angles to the plane thereof and inclined from vertical, as shown, at an angle of about 20 degrees to extend parallel to the segment plate 18. The rods 27 and 28 are pivoted as at 29 to the levers 26 rigidly connected together by a rock-shaft 26ª and pivoted at each end upon a stud 30 near the rear of the machine, said levers 26 having depressions 31 coacting with tongues 32 formed at the rear ends of the usual pair of shift key levers 33, each of which is pivoted to the machine side frames as at 34.

The rods 27 and 28 are preferably mounted in roller bearings to permit elevation of the carriage for shifting, with a minimum of friction. In the preferred embodiment, the bearing for the rod 27 comprises a V-roller 35 pivoted upon screws 36 in the arms of a U-shaped bracket or carrier 37, the latter pivotally mounted on one machine side frame 24 by a shouldered screw 38 through its cross-piece 39. It will be seen, therefore, that in the carriage assembly and in the case-shifting operation, the carriers 37 will swivel, and each roller will angularly adapt itself to its rod 27 or 28 by rotating about its screw 38.

The roller bearing 35 for the other rod 28 may be identical with that described, but, instead of being mounted directly upon the other side frame 24, said bearing is secured to a carrying bracket 40 pivoted as at 41 about an axis parallel to that of the roller bearing 35, the bracket in its entirety being shifted about pivot 41 to shift the corresponding roller bearings 35 relatively to the rod 28 so that the carriage can be readily adjusted and aligned in position on the machine frame for a free up and down movement of the rods 27 and 28 between the two roller bearings 35. An adjusting screw 42 threaded through the machine side frame 24 coacts with bracket 40 to provide a working tension for the roller bearing with the rods 27 and 28, after the carriage-shift frame has been set into the machine frame. If desired, two roller bearings may be provided for each rod.

Pivoted upon the shift key levers 33 as at 43 is the shift key lock lever 44 maintained in normal raised position by a coil spring 45 connecting an integral tongue 46 of the lock lever to the shift key lever. A fixed screw-stud 47 projects from the side frame of the machine and a notch 48 near the upper forward edge of tongue 46 is arranged to extend under the stud 47 for locking the shift key in depressed position. Thus, to lock for capitals, the lock lever 44 is depressed, lowering the shift key lever 33 with it, the lock lever moving about its pivot 43 on the shift key lever to dispose the notch 48 thereof under the stud 47, so that the vertical arm of the lock key lever serves as a strut, to maintain the shift key in depressed position.

To release the lock, the shift key 33 is depressed, the resilience of the material permitting a slight depression, sufficient to release the grip of the strut on the stud 47, allowing the spring 45 to retract the lock lever 44.

The carriage is limited in its case shifting movement by the levers 26 contacting with adjustable stops or studs 49 and 50. The studs 49 and 50 are threaded into the frame 24, provided with check-nuts and their forward ends extend into the path of the levers 26. These ends are tapered as at 51 so that by threading the studs in or out the amount of movement of the levers 26 between the studs is varied, thereby varying the case shift movement for the frame 20.

It will be understood that the typing position on the platen is between a front-strike and a top-strike position; that this typing position is established by the tilting of the type-bar segment rearwardly out of the vertical; that the plane of the segment establishes a path for the carriage-frame in case-shifting, which is parallel thereto; that the rollers 35 have an endwise clearance space between the ears of each U-shaped bracket 37; and that screws 36 may be threaded through the ears of the brackets 37 to bodily shift the rollers and establish a typing line on the platen adjusted to the typing faces of the type-bars.

Variations may be resorted to within the scope of the invention, and portions of the improvements may be used without others.

Having thus described my invention, I claim:

1. In a typewriting machine, the combination with a stationary segment of upwardly and rearwardly striking type-bars, a platen-carriage, a case-shiftable carriage-frame having a guide-rod secured to each end thereof to depend at right angles therefrom, and a pair of spaced grooved rollers, one roller to engage each guide-rod, of means for individually mounting each roller upon the machine-frame with the groove thereof engaging the adjacent outer side face of a shift-rod, said means including a carrier at each side of the machine-frame and each roller individually adjustable within the carrier to vary the angular direction of the carriage-frame guide-rods.

2. In a typewriting machine, the combination with a stationary segment of upwardly and rearwardly striking type-bars, a platen-carriage, a case-shiftable carriage-frame having a guide-rod secured to each end thereof to depend at right angles therefrom, and a pair of spaced grooved rollers, one roller to engage each guide-rod, of means for individually mounting each roller upon the machine-frame with the groove thereof engaging the adjacent outer side face of a shift-rod, said means including a carrier at each side of the machine-frame and each roller individually adjustable in the direction of its axis to justify the direction of carriage-frame shift to the fixed typing angle of the segment and type-bars.

3. In a typewriting machine, the combination with a stationary segment of upwardly and rearwardly striking type-bars, a platen-carriage, a case-shiftable carriage-frame having a guide-rod secured to each end thereof to depend at right angles therefrom, and a pair of spaced grooved rollers, one roller to engage each guide-rod, of means for individually mounting each roller upon the machine-frame with the groove thereof engaging the adjacent outer side face of a shift-rod, said means including a carrier for each roller rockably mounted upon opposite side frames of the machine to automatically adjust the groove of its roller to the plane of the adjacent shift-rod, and each roller individually adjustable within its carrier in the direction of its axis to align the direction of case-shift to the inclination of the fixed segment at its type-bars.

4. In a visible-writing typewriter, the combination with a traveling carriage having a platen, of carriage-controlling means including a carriage-supporting and carriage-shifting frame operative to guide the carriage in letter-spacing and also direct the case-shifting movement of the carriage upwardly and rearwardly to give greater visibility in typing, said frame including a pair of carriage-supporting rails, a pair of guide-rods secured to said frame, and a pair of self-centering roller-bearings pivotally mounted to swivel on the machine-frame, one roller co-operative with each guide-rod to guide and support the carriage and platen.

5. In a visible-writing typewriter, the combination with a traveling carriage having a platen, of carriage-controlling means including a carriage-supporting and carriage-shifting frame operative to guide the carriage in letter-spacing and also direct the case-shifting movement of the carriage upwardly and rearwardly to give greater visibility in typing, said frame including a pair of carriage-supporting rails, a pair of guide-rods secured to said frame, and a pair of self-centering roller bearings pivotally mounted on the machine-frame and co-operative with each guide-rod to guide and support the weight of the carriage and platen, and key-actuated means for moving the rods longitudinally to shift the carriage-frame and case-shift the platen.

6. In a typewriting machine, the combination with a stationary segment of type-bars, a platen-carriage, and a case-shiftable carriage-supporting frame, of means for guiding the carriage-frame upwardly and rearwardly for a typing line above the horizontal axis of the platen to give greater visibility in typing, said means including a pair of parallel round guide-rods supporting said frame and side-engaging, direction-determining, self-centering grooved rolls upon the frame of the machine, said guide-rods slidable between said rolls.

7. In a typewriting machine, the combination with a stationary segment of type-bars, a platen-carriage, and a case-shiftable carriage-supporting frame, of means for guiding the carriage-frame upwardly and rearwardly for a typing line above the horizontal axis of the platen to give greater visibility in typing, said means including a pair of parallel guide-rods fixed to said frame and side-engaging direction-determining grooved rolls upon the frame of the machine, said guide-rods slidable between said rolls, and means on the frame of the machine including a pair of arms, each arm pivotally connected to the free end of a guide-rod to support the weight of carriage and frame and a stop for each arm to rest upon.

8. In a typewriting machine, the combination with a stationary segment of type-bars, a platen-carriage, and a case-shiftable carriage-supporting frame, of means for guiding the carriage-frame upwardly and rearwardly for a typing line above the horizontal axis of the platen to give greater visibility in typing, said means including a pair of parallel guide-rods fixed to said frame, and side-engaging direction-determining grooved rolls upon the frame of the machine, said guide-rods slidable between said rolls, a rocker upon the machine-frame having a pair of arms joined together by a rock-shaft, each arm pivotally supporting the free end of one guide-rod to support the weight of the carriage-supporting frame, a stop on the machine-frame for each arm to rest upon, and a key having an interruptive connection with one arm to vibrate the rocker and shift the carriage-frame.

9. In a typewriting machine, the combination with a stationary segment of type-bars, a platen-carriage, and a case-shiftable carriage-supporting frame, of means for guiding the carriage-frame upwardly and rearwardly for a typing line above the horizontal axis of the platen to give greater visibility in typing, said means including a pair of parallel guide-rods fixed to said frame, and side-engaging direction-determining grooved rolls upon the frame of the machine, said guide-rods slidable between said rolls, a supporting arm for each rod, and a pair of stop-pins for each arm to limit its movement in two directions, each pin having a threaded body to pass through the machine-frame and a tapering end to be aligned to the arm and adjust the throw of the arm by the taper on the pin.

10. In a typewriting machine, the combination with a stationary segment of type-bars, a platen-carriage, and a case-shiftable carriage-supporting frame, of means for guiding the carriage-frame upwardly and rearwardly for a typing line above the horizontal axis of the platen to give greater visibility in typing, said means including a pair of parallel guide-rods fixed to said frame, and side-engaging direction-determining grooved rolls upon the frame of the machine, said guide-rods slidable between said rolls, a supporting arm for each rod, a stop-pin for each arm, and a counterbalancing spring individual to each arm and jointly operative to reduce the carriage weight upon the stop-pins.

11. In a typewriting machine, the combination with a stationary segment of type-bars, a platen-carriage, and a case-shiftable carriage-supporting frame, of means for guiding the carriage upwardly and rearwardly for a typing line above the horizontal axis of the platen to give greater visibility in typing, said means including a pair of parallel guide-rods permanently fixed at one end to said frame, and side-engaging direction-determining grooved rolls upon the frame of the machine, said guide-rods slidable between said rolls, a rocker on the machine-frame having a pair of arms joined together by a rock-shaft, each arm having a pivotal connection with the free end of a guide-rod to support the weight of the carriage-frame, stops for the arms to rest upon, a shift-key engageable under one arm to rock the shaft and raise the carriage-shift-frame, and stops on the machine-frame to engage each arm and limit the key-lifted movement of the shift-frame.

12. In a visible-writing typewriter, the combination of a shiftable platen, an upwardly and rearwardly movable shift frame supporting the carriage, upwardly and rearwardly extending guide-rods fixed to the shift frame at right angles thereto, self-centering grooved rollers cooperative with the guide-rods, a rock-shaft having crank-arms which are connected to the lower ends of the guide-rods, and key-actuated means for turning said rock-shaft to lift the shift frame.

13. In a visible-writing typewriter, the combination of a shiftable platen, an upwardly and rearwardly movable shift frame supporting the carriage, upwardly and rearwardly extending guide-rods fixed to the shift frame at right angles thereto, self-centering grooved rollers cooperative with the guide-rods, a rock-shaft having crank-arms which are connected to the lower ends of the guide-rods, and a pair of key-levers operative to turn said rock-shaft, one key mounted upon the other key to simultaneously depress and lock down both keys.

14. In a typewriting machine having side frames, the combination with a platen-carriage, of a carriage-supporting and case-shifting frame including a pair of horizontal ball-bearing rails for the carriage, a horizontal cross-bar, a pair of guide-rods fixed to the cross-bar at right angles thereto, and grooved roller-bearings mounted upon the side frames of the machine to engage the adjacent face of the rods, to guide and support the carriage and platen in typing, at least one of the roller-bearings being adjustable relatively to the opposite bearing and each roller-bearing being also self-adjustable to the plane of the guide-rods in case-shifting.

15. In a typewriting machine, the combination with a shiftable platen and carriage, and a carriage-shift frame having guide-rods to direct the frame upwardly and rearwardly, of universal jointed roller-bearings for each rod, crank-arms carried by a rock-shaft and pivotally connected to said rods, and key-actuated means individually operative upon the ends of the rock-shaft to effect a joint case-shift longitudinal shifting movement of the rods.

LOUIS A. NEMCOVSKY.